June 23, 1959     A. R. CORTHALS     2,891,436

SERVO-CONTROLLED PROFILING APPARATUS FOR USE WITH MACHINE TOOLS

Filed Jan. 5, 1954     4 Sheets-Sheet 1

AUGUSTE R. CORTHALS
INVENTOR

By Richardson, David & Nordon
his ATTYS.

June 23, 1959 A. R. CORTHALS 2,891,436
SERVO-CONTROLLED PROFILING APPARATUS FOR USE WITH MACHINE TOOLS
Filed Jan. 5, 1954 4 Sheets-Sheet 2

INVENTOR.
AUGUSTE R. CORTHALS
BY
Richardson, David & Nordon

June 23, 1959 A. R. CORTHALS 2,891,436
SERVO-CONTROLLED PROFILING APPARATUS FOR USE WITH MACHINE TOOLS
Filed Jan. 5, 1954 4 Sheets-Sheet 4

INVENTOR.
AUGUSTE R. CORTHALS
BY
Richardson, David & Nordon

United States Patent Office 2,891,436
Patented June 23, 1959

2,891,436

SERVO-CONTROLLED PROFILING APPARATUS FOR USE WITH MACHINE TOOLS

Auguste R. Corthals, Woluwe-St-Pierre, Belgium

Application January 5, 1954, Serial No. 402,381

Claims priority, application Belgium January 9, 1953

3 Claims. (Cl. 82—14)

The present invention relates to servo-controlled profiling apparatus for use with machine tools.

More especially the invention concerns improvements to apparatus for machining, from a profile established on a fixed template, a work-piece mounted on a machine tool such as, for example, a slide lathe.

Conventional profiling apparatus is known which comprises a cutting tool mounted on the lathe slide, the position of the cutting tool being controlled during the course of each cut by an hydraulic servo-motor system, the tool slide being angularly adjustable. In such apparatus the hydraulic pilot valve for positioning the cutting tool is actuated by carrying a stylus which follows the contours of a profile established on a template.

In forms of embodiment hitherto proposed, and especially in the Swiss Patents 243,521, 256,049 and 283,159, the profiling apparatus there shown embodies certain features which restrict its range of utility.

When using this prior apparatus, it is necessary to adjust the position of the cutting tool with respect to the servo-motor, or to adjust the position of the template or of the servo-control pilot valve with respect to the stylus between successive cuts in order to control the depth of each cut. Moreover, when cutting tool is fed at an angle suitable for turning right angle shoulders on the work-piece, it is necessary to resort to a trigonometric calculation for each successive cut to determine the magnitude of the adjustment necessary to produce a particular desired depth of cut.

The present invention has among its objects the provision of a single fixed template and a calibrated feed screw by which the depth of each cut may be determined, even though the cutting tool is fed into the work-piece at an angle with respect to the rotational axis of the work-piece in the case of a lathe. This avoids all necessity for the adjustment of anything except the calibrated feed screw between successive cuts.

A further object of the invention is the provision of calibrated means for adjusting the stylus with reference to the template, independently of the feed screw.

Other and further objects and advantages of the invention will become apparent upon reading the following specification together with the accompanying drawing forming a part hereof.

Referring to the drawing.

Figure 1:
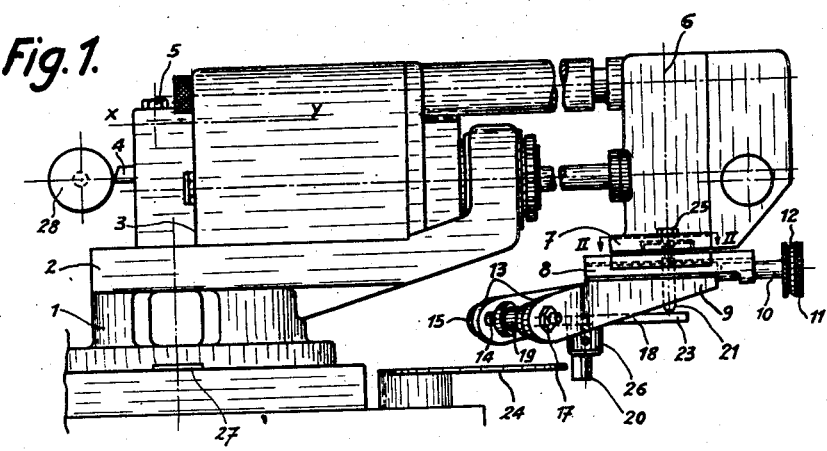
Figure 1 is a diagrammatic elevational view of a lathe embodying the invention.
Figure 2:
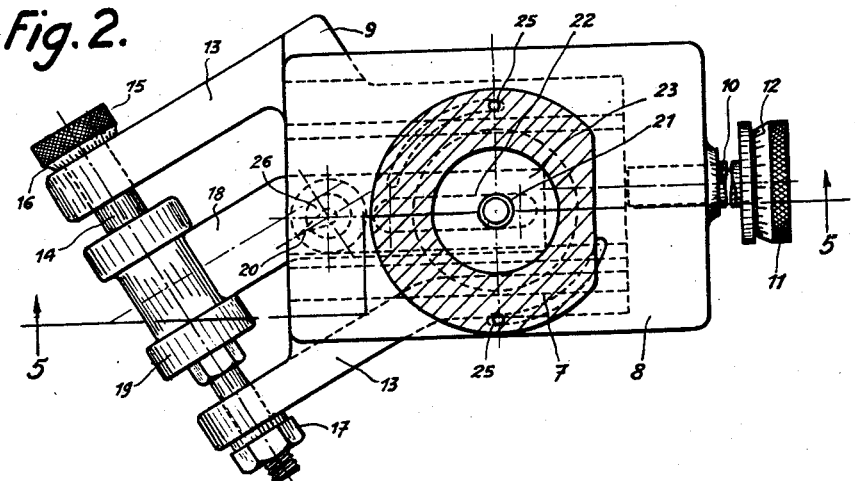
Figure 2 is an enlarged plan sectional view taken along the line II—II of Fig. 1.

Referring to Fig. 1, there is shown an angularly adjustable tool slide member 1 having slideways 2 formed thereon. An hydraulic servo-motor 3 of conventional construction carries a cutting tool 4 secured thereto by screws 5 and which may move parallel to the slideways 2 of tool slide member 1. The usual means are provided for producing relative cutting movement between the cutting tool 4 and a work-piece 28 throughout the course of each cut, these means being omitted from the drawing for simplicity of illustration. Relative feeding movement between the cutting tool 4 and the work-piece 28 is produced by the hydraulic servo-motor 3.

The servo-motor 3 is controlled by a pilot valve 6 secured to the tool slide member 1 for movement therewith. The servo-control valve 6 is connected by suitable hydraulic means with the servo-motor 3 to control the position of the cutting tool 4 longitudinally of the slideways 2 of tool slide member 1.

The lower end 7 of pilot valve 6 carries a supporting member 8 which may be rotated for purposes of adjustment about a vertical axis concentric with a vertically movable control element 21 of pilot valve 6. Slidably mounted beneath the supporting member 8 is a stylus carrying slide member 9. The position of slide member 9 may be adjusted by means of a feed screw 10 provided with a knurled adjusting knob 11 and a calibrated scale 12.

Slide member 9 comprises a bracket formed by two spaced ears 13. A pivot pin 14 extends between the outer ends of the ears 13 and is threaded into at least one of the ears 13. Pivot pin 14 may be moved axially by means of a knurled adjusting knob 15 disposed at one end thereof and provided with a calibrated scale 16. The pivot pin 14 may be secured in a desired position of adjustment by means of a lock nut 17 threaded on the other end thereof.

A stylus lever 18 is freely rotatably mounted on pivot pin 14 and is shown secured against axial movement therealong so that the position of lever 18 may be adjusted relative to the ears 13 by means of the knurled knob 15. The stylus lever 18 is provided with a stylus holding socket 26 disposed on the under side thereof. A stylus 20 is rotatably disposed in the socket 26 and may be secured in any desired position of angular rotation adjustment about a generally vertical axis by means of a lock nut (not shown).

The vertically movable control member 21 passes freely through an elongated slot 22 formed in the stylus carrying slide member 9 and which permits the slide member 9 to move past the control member 21 under the influence of feed screw 10 without interference. The lower end of the vertically movable control member 21 rests on the upper surface of the stylus lever 18 and follows its movements for controlling the position of cutting tool 4 through the action of servo-motor 3.

By appropriate adjustment of the position of the stylus carrying slide member 9 by means of feed screw 10, the stylus 20 may be brought into engagement with a template 24 fixed to the frame of the machine tool. The template 24 is contoured at its right hand edge with a profile which will control the finished configuration of the work-piece 28.

Figure 3:
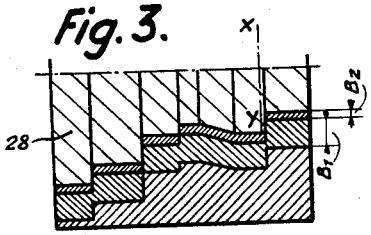
Figure 3 is a sectional view showing a fragment of a work-piece machined by the apparatus of Figs. 1 and 2.
Figure 4:
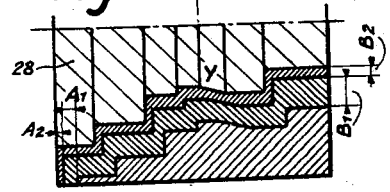
Figure 4 is a view similar to Fig. 3, showing a work-piece machined using certain conventional profiling apparatus.
Figure 5:
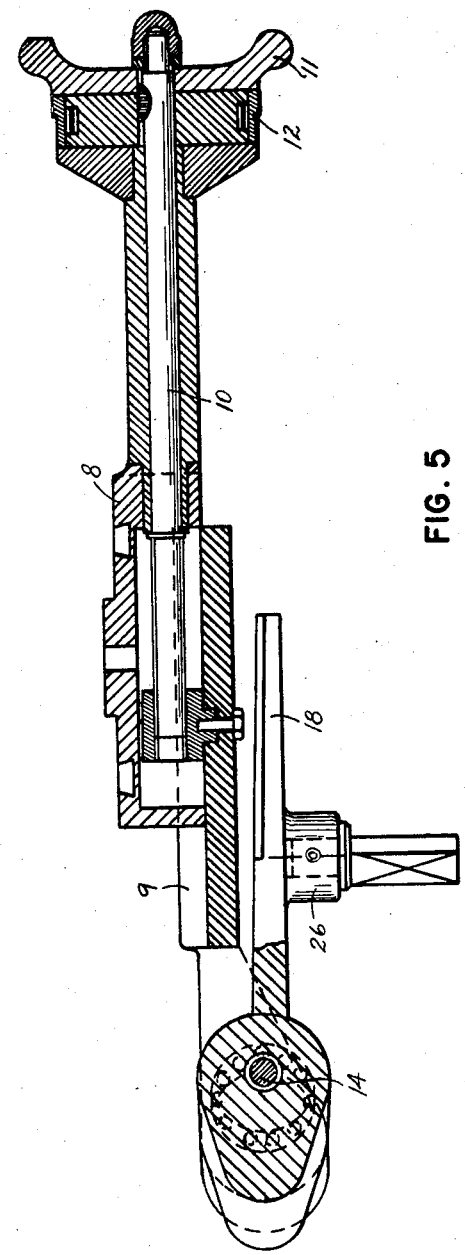
Figure 5 is an enlarged sectional view taken substantially along line 5—5 of Figure 2.
Figure 6:
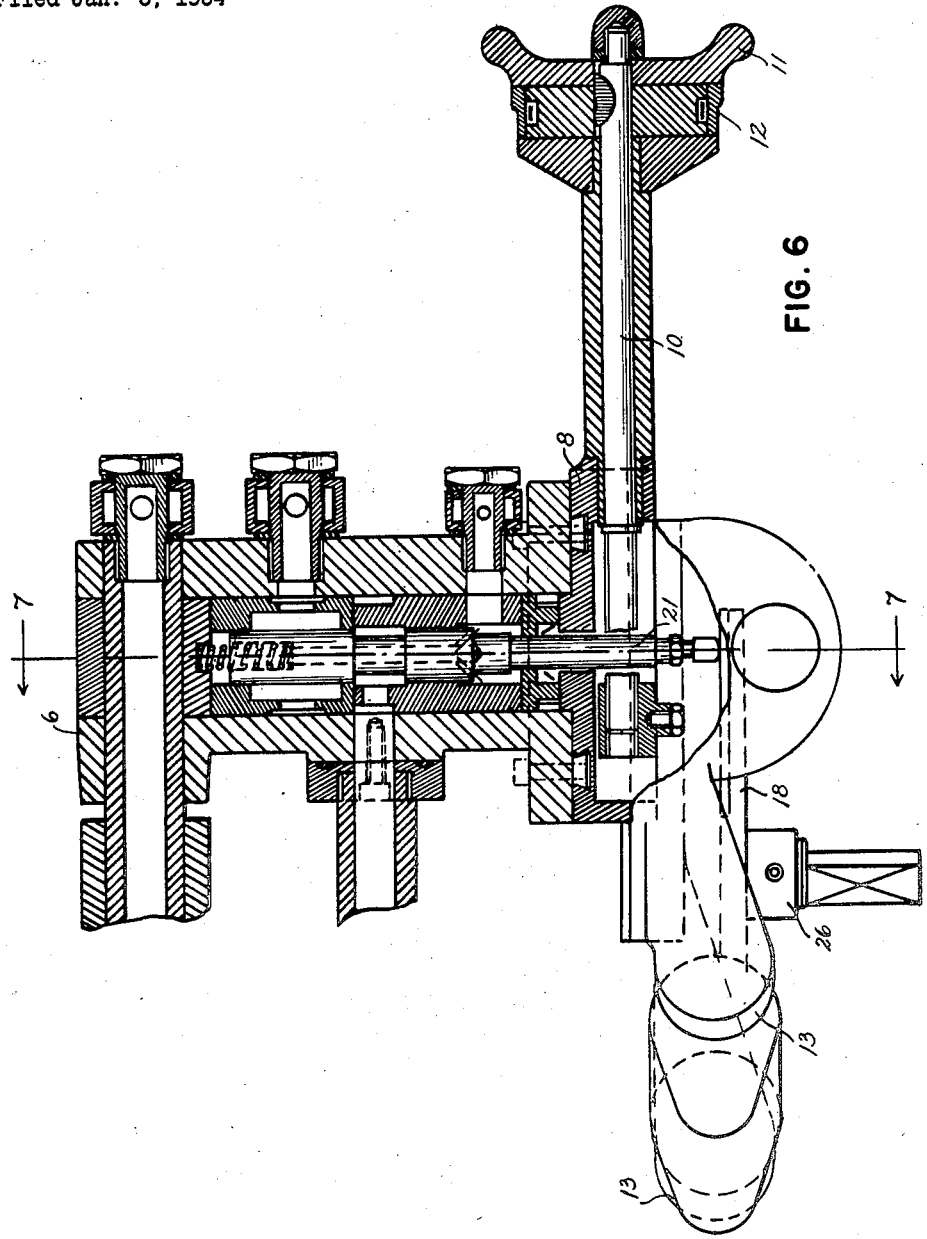
Figure 6 is a fragmentary enlarged view similar to Figure 1 but partially broken away to illustrate certain details of construction.
Figure 7:
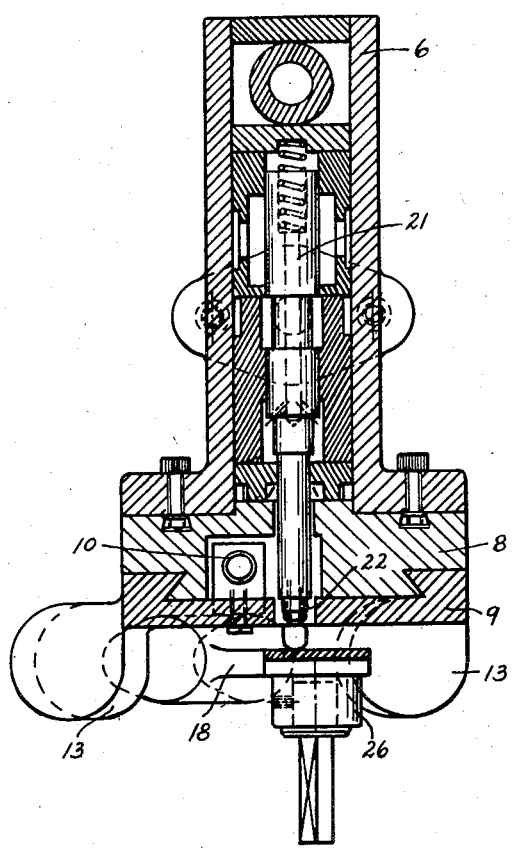
Figure 7 is a sectional view taken substantially along line 7—7 of Figure 6.

In operation, the angle of feeding movement of the cutting tool 4 may be adjusted as desired by rotating the tool slide member 1 on its pivot 27. Having set the tool slide member 1 so that its slideways 2 provide the desired angle or direction of feeding movement for the cutting tool 4, the stylus carrying slide member 9 is then adjusted so that the longitudinal axis of feed screw 10 and the corresponding direction of movement of slide member 9 are perpendicular to the rotational axis of the work-piece 28 as indicated by the line X—Y in Figs. 1, 3 and 4. Movement of slide member 9 along the direction of the line X—Y controls the actual depth of cut for each successive cut by producing a corresponding relative movement between the stylus 20 and the template 24 in the direction of the cut, irrespective of any angle of inclination of the slideways 2 with respect to the direction perpendicular to the rotational axis of the work-piece 28. The direction of action of the feed screw 10 is thus maintained in the direction of dimensional reduction of the work-piece 28 by cutting tool 4 during successive cuts. This permits the setting of the depth of successive cuts by means of the calibrated scale 12 associated with the knurled knob 11 of feed screw 10 directly and without resorting to any trigonometric computations.

The inclination of the stylus 20 and the oblique direction of the axis of pivot pin 14 facilitate movement of the stylus 20 over rectangular corners which may be included in the contoured profile of template 24.

It will be further noted that the adjustment of stylus supporting carriage 9, being always in the direction in which the cutting tool 4 is advanced for successive cuts, makes it unnecessary to increase the length of the work-piece 28 by an amount equal to the sum of the depths of the several cuts multiplied by the tangent of the angle by which the direction of the slideways 2 deviates from the normal to the rotational axis of the work-piece 28. The waste of material is thus avoided as indicated by the waste material between the lines $A_1$ and $A_2$ shown in Fig. 4 as compared with the same finished work-piece shown in Fig. 3 which was machined using profiling apparatus embodying the present invention.

The longitudinal adjustability of pivot pin 14 by means of knob 15 makes it possible to compensate for a slight amount of non-parallelism between the rotational axis of work-piece 28 and the direction of alignment of the contoured right hand edge of template 24.

The profiling apparatus of the invention may also be applied to a planer or shaper instead of a lathe, as illustratively described above, or to any other machine tool wherein the directions of cutting tool movement effected by the servo-motor is oblique with respect to the direction of dimensional reduction of the work-piece by successive cuts.

It will be appreciated that many changes and modifications will be apparent to those skilled in the art without departing from the spirit of the invention as defined in the appended claims.

What is claimed is:

1. A profiling apparatus comprising a tool slide, a support mounted for angular adjustment on said tool slide, a sub-slide mounted for reciprocation on said support, a tool holder mounted on said sub-slide for supporting a cutting tool and for permitting relative feeding movement between a work-piece and a cutting tool one toward the other for successive cuts, servo-motor means operating between said support and said sub-slide for causing said feeding movement; stylus means adapted to be engageable with a contoured portion of a template throughout the course of each cut; supporting means carried by said sub-slide and being mounted for angular adjustment with respect thereto in a plane parallel to the plane of adjustment of said first-mentioned support; a slide mounted on said last mentioned support for straight line reciprocation; means mounted on said slide for supporting said stylus means; control means for said servo-motor actuated by said stylus means and responsive to the configuration of a template profile throughout the course of each cut; and manually adjustable feed screw means interconnecting said stylus slide and said second mentioned support for incrementally causing said feeding movement for successive ones of said cuts; said feed screw means being capable of acting in the direction of dimensional reduction of said work-piece by said cutting tool in the course of successive cuts irrespective of the direction of said feeding movement by the angular adjustment of said second mentioned support.

2. Profiling apparatus according to claim 1, in which said supporting means carried by said sub-slide comprises a bracket carried by said tool holder, and a pivot pin carried by said bracket and inclined at an acute angle with respect to the rotational axis of said feed screw means, said stylus means being pivotally mounted on said pivot pin.

3. Profiling apparatus according to claim 2, further comprising manually operable adjusting means carried by said bracket and acting on said stylus means for permitting longitudinal adjustment of the position of said stylus means along said pivot pin.

References Cited in the file of this patent

UNITED STATES PATENTS

| | | |
|---|---|---|
| 2,250,241 | Thalmann | July 22, 1941 |
| 2,389,653 | Turchan | Nov. 27, 1945 |
| 2,474,134 | Waterson | June 21, 1949 |
| 2,559,138 | Waterson | July 3, 1951 |
| 2,594,694 | Smith | Apr. 29, 1952 |
| 2,601,345 | Turchan | June 24, 1952 |